United States Patent
Van Liere et al.

(10) Patent No.: US 6,862,334 B2
(45) Date of Patent: Mar. 1, 2005

(54) METHOD OF REDUCING NOISE IN VOLUME IMAGING

(75) Inventors: Filips Van Liere, Eindhoven (NL); Guillaume Rudolf Petrus Thelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/484,303
(22) PCT Filed: Jul. 17, 2002
(86) PCT No.: PCT/IB02/03091
§ 371 (c)(1), (2), (4) Date: Jan. 20, 2004
(87) PCT Pub. No.: WO03/009227
PCT Pub. Date: Jan. 30, 2003

(65) Prior Publication Data
US 2004/0199064 A1 Oct. 7, 2004

(30) Foreign Application Priority Data
Jul. 19, 2001 (EP) ............................................. 01202763

(51) Int. Cl.$^7$ ................................................ G01N 23/04
(52) U.S. Cl. ........................................... 378/4; 378/901
(58) Field of Search ............................ 378/4, 8, 15, 19, 378/901

(56) References Cited

U.S. PATENT DOCUMENTS 5,204,627 A * 4/1993 Mistretta et al. ............ 324/309

OTHER PUBLICATIONS

Thelissen, G.R.P.; Maximum Average Projection (MAP); A fast and robust way to visualize 3–D MR data sets; Proc. of ISMRM, 1998; p. 2105.

* cited by examiner

Primary Examiner—David V Bruce
(74) Attorney, Agent, or Firm—Thomas M. Lundin

(57) ABSTRACT

In a method of visualizing a three-dimensional volume image data set (1), a two-dimensional image (15) is formed by projecting volume image data on a projection plane in that for each pixel (16) there is determined an intensity value which corresponds to the maximum value or minimum value of the mean intensity along a projection path (17) through the imaged volume and associated with the relevant pixel. In order to determine the mean intensity, averaging is performed over a plurality of intensity values which neighbor one another along the projection path (17). In order to achieve effective noise suppression as well as adequate along image contrast , averaging is performed over at least partly overlapping interval (18 to 22) along the projection path (17). The method offer the advantage that the user can choose the width of the averaging interval as an additional free parameter, so that image contrast and background noise can be influenced independently.

6 Claims, 3 Drawing Sheets

METHOD OF REDUCING NOISE IN VOLUME IMAGING

The invention relates to a method of visualizing a three-dimensional volume image data set which contains a plurality of intensity values on a discrete spatial grid, in which method a two-dimensional image is formed by projecting the volume image data on a projection plane in that for each pixel there is determined an intensity value which corresponds to the maximum value or minimum value of the mean intensity along a projection path which extends through the imaged volume and is associated with the relevant pixel, the mean intensity being calculated by averaging over a plurality of intensity values of the volume image data set which neighbor one another along the projection path. The invention also relates to an imaging diagnostic apparatus, notably a CT apparatus or an MR apparatus, and to a computer program for carrying out the method in accordance with the invention.

Optimum visualization of image data is of crucial importance for medical applications, because such applications concern the formation of diagnostic images which are produced, for example, by means of computed tomography (CT) or by means of magnetic resonance tomography (MR). The object is to make the characteristic anatomical structures inside a patient to be examined recognizable on the basis of a two-dimensional rendition. In medical imaging volume image data of a region of interest of the patient to be examined is reconstructed from the absorption of the X-rays (CT) or from the spin resonance signals (MR). The resultant image data set contains intensity values for each point of a discrete spatial grid. This data set, consisting of equidistant, so-called voxels, is further processed by means of suitable methods in the reconstruction unit of the relevant diagnostic imaging apparatus, that is, so as to visualize the anatomical structures, consisting of different types of tissue, on the basis of the different image intensities.

The quality of the visualization is decisively dependent on the method used to transform the three-dimensional volume image data into a two-dimensional rendition. It is important that no crucial image information is lost by the reduction from three to two dimensions.

There are various known methods of forming a two-dimensional image by projecting the volume image data on a projection plane. Each pixel of the projection image is then associated with a rectilinear projection path which extends through the imaged volume and is oriented perpendicularly to the image plane. For each pixel an intensity value is determined by evaluation of the intensity variation along the relevant projection path. In the simplest case the intensity values of the volume image data set are averaged along each individual projection path. The intensity values are then summed and subsequently divided by the number of voxels situated along the relevant projection path. This approach offers the advantage that background noise which is inevitably present in real image data is effectively suppressed as a result of the averaging. This method, which is also referred to as the Collapsed View (CV) method, has the unacceptable side effect that the image contrast is reduced to such an extent that only objects exhibiting extreme differences in intensity can still be recognized in the resultant image. Depending on the relevant application, the image structures of interest are characterized by particularly high or particularly low intensity values. CT angiography, for example, utilizes the fact that the blood present in the vessels being examined yields a higher voxel intensity than the other organs of the imaged anatomy. In these cases the use of the so-called Maximum (Minimum) Intensity Projection (MIP and mIP, respectively) method has become customary for generating two-dimensional projection images. The intensity value which corresponds to the maximum value or the minimum value of the voxel intensity along the projection path associated with the relevant pixel is then associated with each pixel of the two-dimensional projection image. The MIP or mIP method is very fast and reliably produces the desired image information upon reduction of the image data to two dimensions. However, it is also known that this method tends to give rise to artifacts which cannot be readily recognized in the resultant image. Furthermore, the MIP or mIP method emphasizes the background signal (noise) so that in given circumstances individual image objects will not be clearly visualized in the resultant image.

In order to overcome said drawbacks, Thelissen proposes a so-called Maximum Average Projection (MAP) method in which averaging over a selectable number of voxels which succeed one another along the relevant projection path is performed prior to the determination of the maximum intensity value (Guillaume R. P. Thelissen, "Maximum Average Projection (MAP): A fast and robust way to visualize 3-dimensional MR data-sets", Proceedings of the ISMRM 1998, 2105). The known method at the same time effectively suppresses the background noise and the desired contrast enhancement is achieved as in the MIP method. Since it is possible to select the number of successive voxels along the relevant projection path over which averaging takes place in accordance with the known method, the quality of the two-dimensional projection image is adjustable. For adaptation to the relevant image noise the user can choose this value to be such that an as optimum as possible compromise is obtained between noise and image contrast.

The main drawback of the known method resides in the fact that as before a contradiction continues to exist between the desire for an as weak as possible image noise and an as high as possible image contrast. According to the known method the volume image data set is subdivided into mutually independent image slices prior to the determination of the maximum intensity values, the thickness of said slices being dependent on the number of voxels over which the averaging is carried out. The previously mentioned Collapsed View (CV) method is applied to a given extent to each of these image slices in order to calculate the mean intensity values. These mean intensity values are compared with one another along the relevant projection path in order to determine the maximum value for the resultant projection image. The thicker the image slices are, that is, the larger the number of voxels over which averaging takes place, the smaller the number of mean intensity values evaluated during the projection will be. When a particularly strong noise suppression is desirable, averaging should take place over intervals which are as large as possible. However, this has an adverse effect on the image contrast, because the projection is then based on a correspondingly smaller number of mean intensity values. It is also particularly disadvantageous that in the known method image information may be lost when the structures imaged are situated at the boundary between neighboring averaging intervals. This may give rise to image artefacts so that the known method becomes rather problematic, that is, notably for diagnostic imaging.

Considering the foregoing, it is an object of the present invention to improve the known method to such an extent that an as effective as possible noise suppression takes place without giving rise, if possible, to loss of image information.

This object is achieved on the basis of a method of the kind set forth in that averaging is carried out over at least partly overlapping intervals along the projection path.

An advantage of the method in accordance with the invention resides in the fact that, because of their partial overlapping, the averaging zones are larger than in the known method, so that overall the noise suppression is more effective. A further advantage consists in that, as opposed to the known method, the number of mean intensity values evaluated during the projection is not limited by the selected width of the averaging interval. Because the averaging intervals overlap at least partly, the number of intensity values over which the averaging operation is carried out can be selected independently of the number of mean values. Because the density of the mean intensity values along the projection path may be significantly higher, the desired maximum or minimum intensity value will be determined with an accuracy which is significantly higher than that achieved in the known method. Moreover, no undesirable image artefacts occur, not even when the width of the averaging interval is larger than the image structures of interest.

In an advantageous further version of the method in accordance with the invention the averaging is carried out by convolution of the intensity variation along the projection path with a weighting function which has a selectable width which is larger than the distance in space between two neighboring data points of the volume image data set. Such a convolution provides smoothing of the intensity variation along the projection path. The width of the smoothing function can then be selected at will as an independent parameter. The method in accordance with the invention can be carried out in such a manner that, despite the averaging, the overall number of intensity values on which the projection is based is maintained. When a suitable weighting function is chosen for the convolution, for example, a Gaussian function, the maxima or minima of the intensity variation will be maintained even when the averaging interval is significantly larger than the image structures to be imaged.

It has been found that for a practical application of the method in accordance with the invention it is effective to carry out the averaging over intervals which overlap each time by one half. Using the same number of mean intensity values which are evaluated during the projection, the width of the averaging interval is then twice as large as in the known method. The noise suppression is thus significantly improved whereas the image contrast is not noticeably degraded.

A CT apparatus or an MR apparatus or other imaging diagnostic apparatus is suitable for carrying out the method in accordance with the invention, the apparatus which includes an imaging unit for the acquisition of coarse data of an object to be examined and also includes a program-controlled reconstruction unit which reconstructs volume image data from the coarse data, the volume image data consisting of a plurality of intensity values on a discrete spatial grid, and also forms a two-dimensional image therefrom by projecting the volume image data on a projection plane, characterized in that projection of the volume image data is carried out by the reconstruction unit in such a manner that for each pixel there is determined an intensity value which corresponds to the maximum value or minimum value of the mean intensity along a projection path which extends through the imaged volume and is associated with the relevant pixel, the mean intensity being calculated by averaging over at least partly overlapping intervals along the projection path. The method in accordance with the invention can be advantageously implemented, that is, without necessitating special adaptations of the hardware, in conventional diagnostic apparatus in clinical use, since only the reconstruction unit is provided with a suitable program for the visualization in accordance with the invention.

A computer program is suitable for this purpose, the computer program characterized in that it forms a two-dimensional image from a three-dimensional volume image data set, consisting of a plurality of intensity values on a discrete spatial grid, by projecting the volume image data on a projection plane in that for each pixel it determines an intensity value which corresponds to the maximum value or minimum value of the mean intensity along a projection path which extends through the imaged volume and is associated with the relevant pixel, the mean intensity being calculated by averaging over at least partly overlapping intervals along the projection path. The computer program also characterized in that it performs the averaging by convolution of the intensity variation along the projection path with a weighting function which has a width which can be selected by the user and is larger than the distance in space between two neighboring data points of the volume image data set. A computer program of this kind can be made available to the users of conventional imaging diagnostic apparatus on a suitable data carrier, for example, a disc or a CD-ROM, or can be offered for downloading via a public data network (the Internet).

DRAWINGS

Embodiments of the invention will be described in detail hereinafter with reference to the Figures. Therein:

DESCRIPTION

Figure 1:
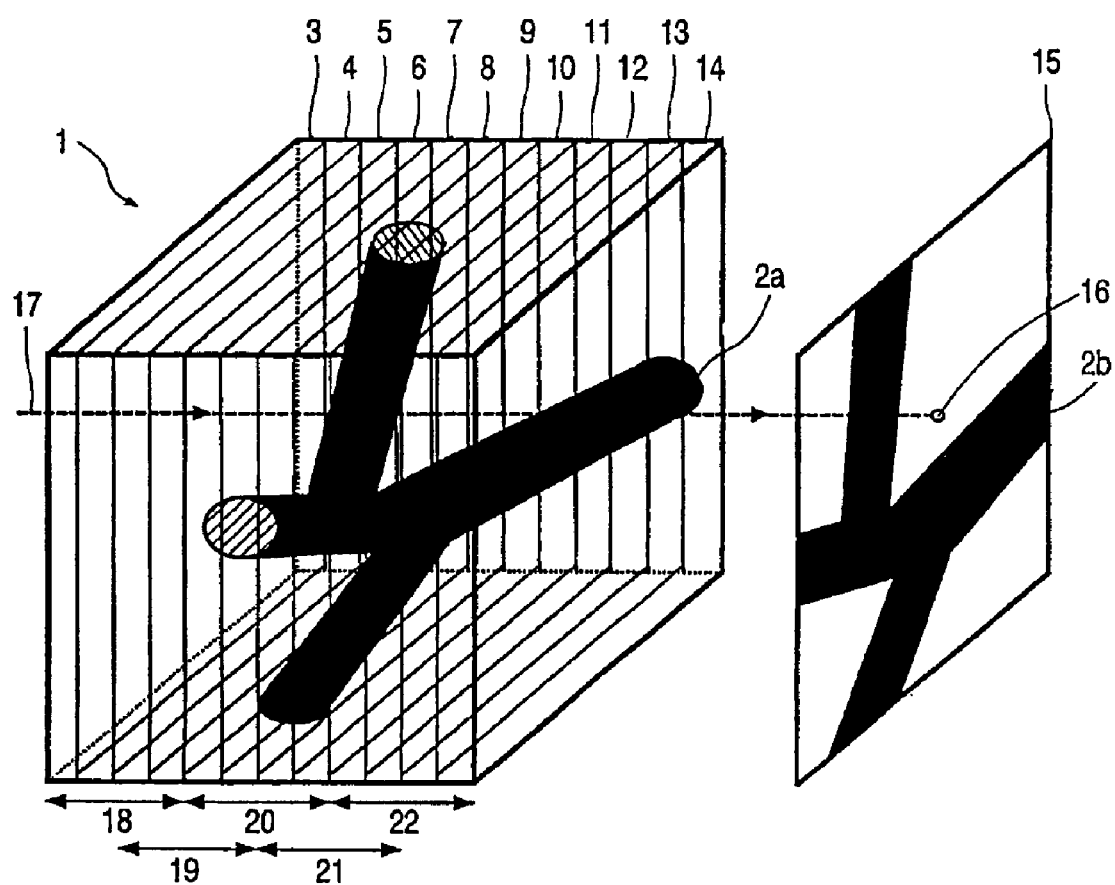
FIG. 1 illustrates the projection method in accordance with the invention.

FIG. 1 shows a three-dimensional volume image data set which is denoted by the reference numeral 1. The examination volume shown has an approximately cubic shape and contains a blood vessel 2 which is characterized by a particularly high image intensity. The volume image data set 1 consists of twelve parallel slice images 3 to 14. Each of the slice images 3 to 14 consists of a two-dimensional matrix of intensity values. In order to visualize the volume image data set 1, a two-dimensional image 15 is formed by projecting the volume image data on the plane of the projection image 15. For each pixel 16 there is determined an intensity value which corresponds to the maximum or minimum value of the mean intensity along a projection path 17 which extends through the imaged volume and is associated with the relevant pixel 16. The plane of the projection image 15 is oriented parallel to the slice images 3 to 14 in FIG. 1. The projection path 17 extends rectilinearly through the volume image data set and is oriented perpendicularly to the projection plane. For the determination of the intensity value for the pixel 16 first the mean intensities within the volume image data set 1 are calculated by averaging over a plurality of intensity values which neighbor one another along the projection path 17. FIG. 1 shows five averaging intervals 18 to 21 which partly overlap one another in conformity with the invention. For each of the averaging intervals 18 to 21 there is determined a mean intensity value. Thus, five mean values are compared with one another in order to find the maximum or minimum value of the mean intensity. For the interval 18 a mean intensity value is calculated for the corresponding point on the projection path 17 by averaging over the slice images 3, 4, 5 and 6. The mean intensity value for the next interval 19 is obtained by averaging over the slices 5, 6, 7 and 8. Thus, in accordance with the invention the slices 5 and 6 are used for the determination of the mean value in the interval 18 and in the interval 19. The method in accordance with the invention yields a planar image 22 of the blood vessel 2.

Figure 2:
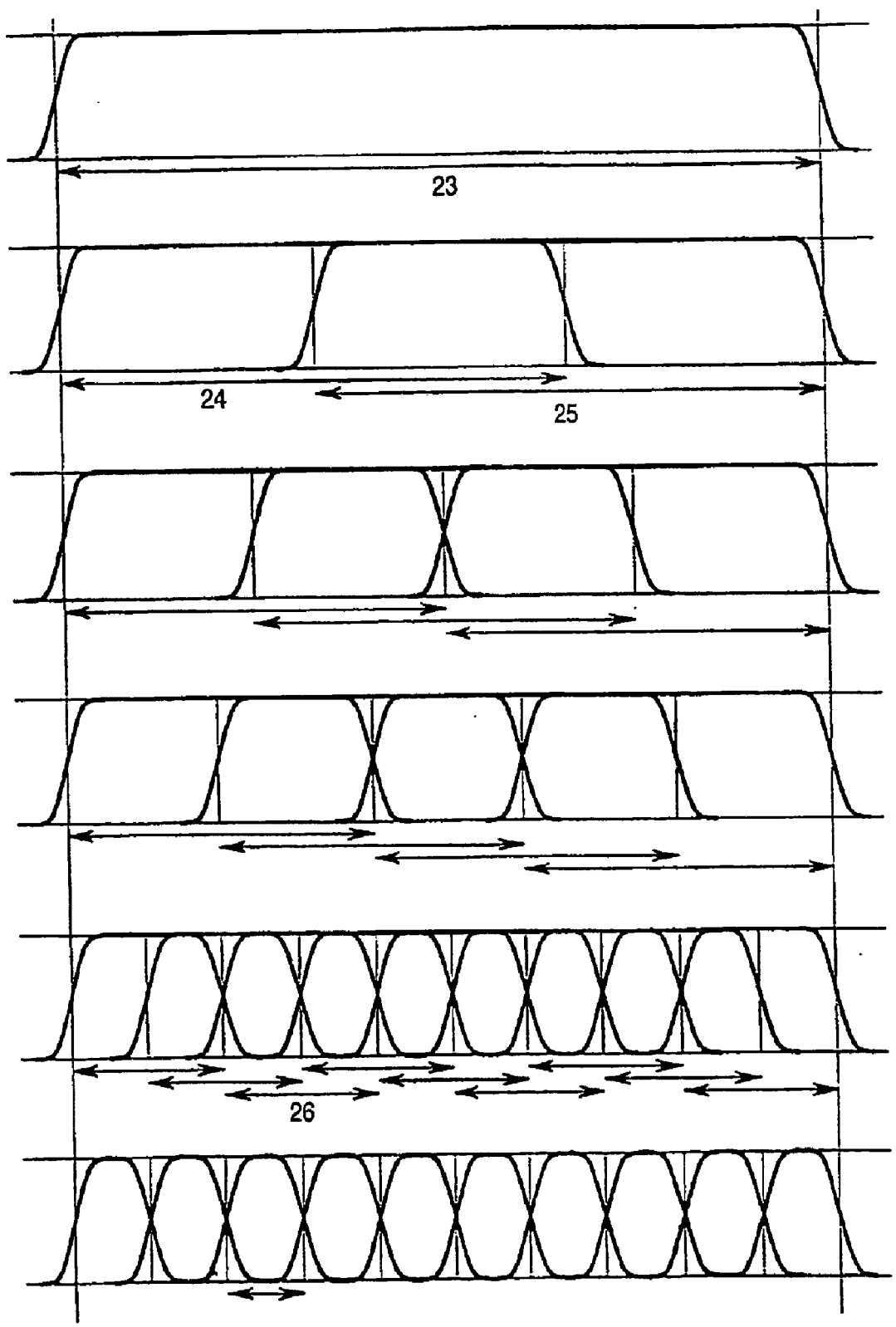
FIG. 2 shows the averaging with averaging intervals which overlap by one half.

FIG. 2 shows various possibilities for the averaging by means of averaging intervals which overlap each time by one half, that is, in the case of a volume image data set consisting of ten slices. In the upper diagram averaging takes place over the entire thickness 23 of the examination zone. This approach corresponds to the previously described Collapsed View (CV) method. In the diagram shown therebelow averaging takes place over two intervals 24 and 25 which overlap in the central third part of the overall examination volume. Three, four and nine mean intensity values, respectively, are determined in the diagrams which are shown therebelow. In the case of nine averaging operations the width of the averaging interval 26 corresponds exactly to two image slices. In the diagram shown at the very bottom no averaging takes place. In that case the projection takes place in conformity with the customary MIP or mIP method.

Figure 3:
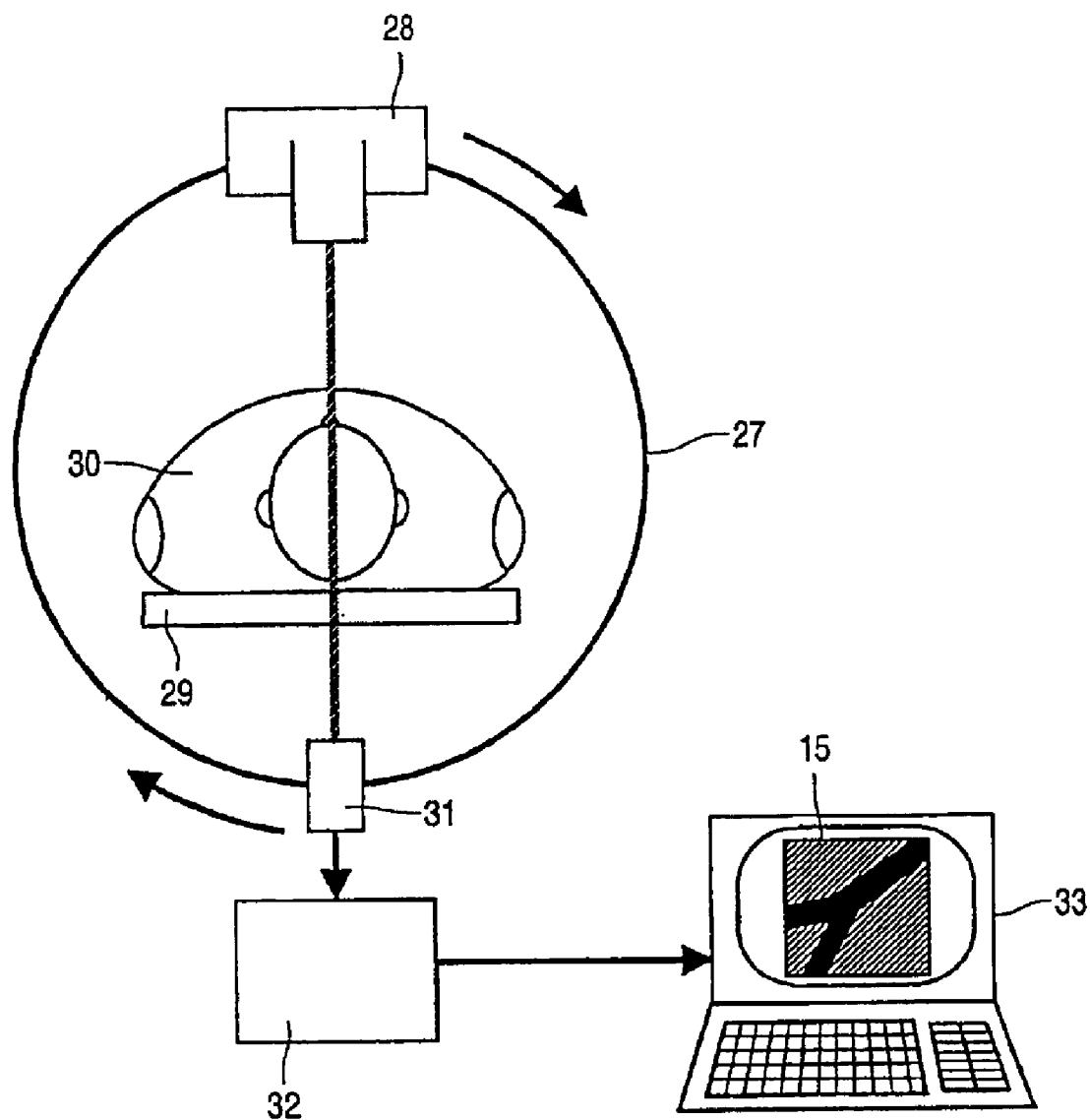
FIG. 3 shows a CT apparatus in accordance with the invention.

The CT apparatus as shown in FIG. 3 consists of a portal 27 on which an X-ray source 28 rotates about a patient table 29 and a patient 30 arranged thereon. On the portal there is also mounted a radiation detector 31 which faces the X-ray source 28 and also rotates about the patient 30. The radiation detector 31 detects the attenuation of an X-ray beam emitted by the X-ray source 28. The X-ray intensity is further processed and digitized by a measuring device 32. This data is then applied to a microcomputer 33 which reconstructs volume image data from the X-ray absorption data. The computer 33 is programmed in such a manner that in conformity with the invention it forms a two-dimensional image 15 from the reconstructed volume image data, said image being displayed on the display unit of the computer 33.

What is claimed is:

1. A method of visualizing a three-dimensional volume image data set (1) which contains a plurality of intensity values on a discrete spatial grid, in which method a two-dimensional image (15) is formed by projecting the volume image data on a projection plane in that for each pixel (16) there is determined an intensity value which corresponds to the maximum value or minimum value of the mean intensity along a projection path (17) which is associated with the relevant pixel and extends through the imaged volume, the mean intensity being calculated by averaging over a plurality of intensity values of the volume image data set (1) which neighbor one another along the projection path, characterized in that the averaging is carried out over at least partly overlapping intervals (18 to 22) along the projection path (17).

2. A method as claimed in claim 1, characterized in that the averaging is carried out by convolution of the intensity variation along the projection path with a weighting function which has a selectable width which is larger than the distance in space between two neighboring data points of the volume image data set.

3. A method as claimed in claim 1, characterized in that the intervals over which the averaging is performed overlap each time by one half.

4. An imaging diagnostic apparatus, notably a CT apparatus or an MR apparatus, for carrying out the method claimed in claim 1, which apparatus includes an imaging unit (27, 28, 31, 32) for the acquisition of coarse data of an object (30) to be examined and also includes a program-controlled reconstruction unit (33) which reconstructs volume image data from the coarse data, said volume image data consisting of a plurality of intensity values on a discrete spatial grid, and also forms a two-dimensional image (15) therefrom by projecting the volume image data on a projection plane, characterized in that projection of the volume image data is carried out by the reconstruction unit (33) in such a manner that for each pixel (16) there is determined an intensity value which corresponds to the maximum value or minimum value of the mean intensity along a projection path (17) which extends through the imaged volume and is associated with the relevant pixel, the mean intensity being calculated by averaging over at least partly overlapping intervals (18 to 22) along the projection path.

5. A computer program for carrying out the method claimed in claim 1, characterized in that it forms a two-dimensional image (15) from a three-dimensional volume image data set (1), consisting of a plurality of intensity values on a discrete spatial grid, by projecting the volume image data on a projection plane in that for each pixel (16) it determines an intensity value which corresponds to the maximum value or minimum value of the mean intensity along a projection path (17) which extends through the imaged volume and is associated with the relevant pixel, the mean intensity being calculated by averaging over at least partly overlapping intervals (18 to 22) along the projection path (17).

6. A computer program as claimed in claim 5, characterized in that it performs the averaging by convolution of the intensity variation along the projection path with a weighting function which has a width which can be selected by the user and is larger than the distance in space between two neighboring data points of the volume image data set.

* * * * *